J. H. & G. C. BECKER.
RECIPROCATING VALVE.
APPLICATION FILED APR. 10, 1909.
960,786.
Patented June 7, 1910.
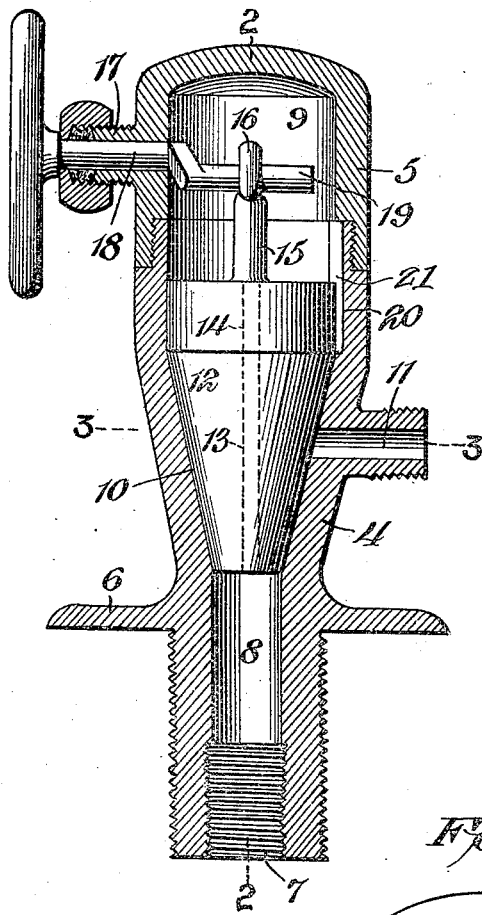
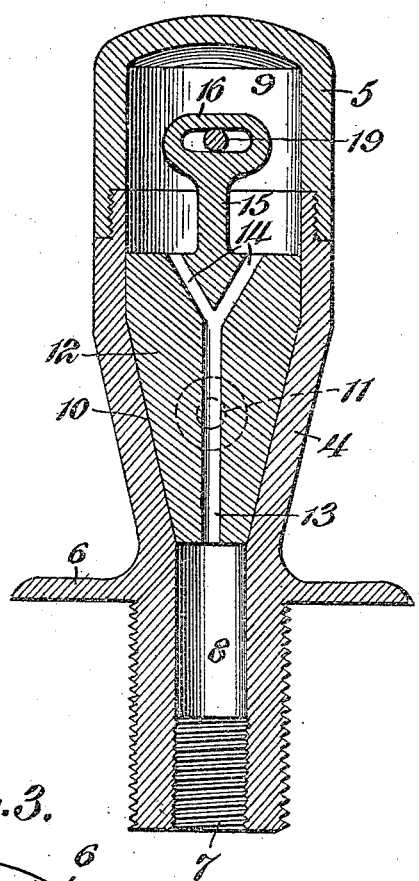
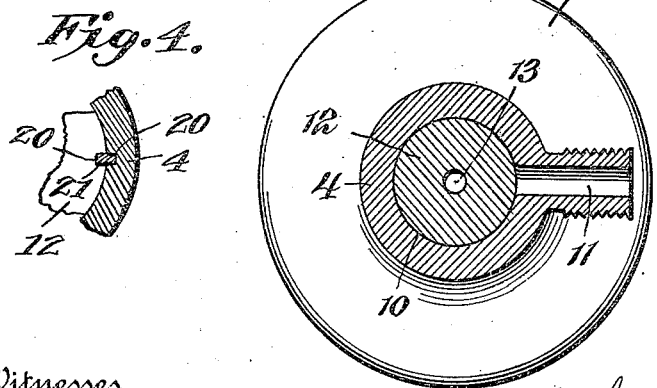
Witnesses
F. Wm. Ernst
L. Steinberg
Inventors
John H. Becker
Grover C. Becker
By William W. Deane
their Attorney

UNITED STATES PATENT OFFICE.

JOHN H. BECKER, OF MANSFIELD, AND GROVER C. BECKER, OF CRESTLINE, OHIO.

RECIPROCATING VALVE.

960,786.  Specification of Letters Patent.  Patented June 7, 1910.

Application filed April 10, 1909. Serial No. 489,240.

*To all whom it may concern:*

Be it known that we, JOHN H. BECKER and GROVER C. BECKER, citizens of the United States, residing, respectively, at Mansfield, in the county of Richland and State of Ohio, and Crestline, in the county of Crawford and State of Ohio, have invented certain new and useful Improvements in Reciprocating Valves, of which the following is a specification.

The present invention relates to valves, and the primary object is to provide an exceedingly simple and novel structure made up of few parts that are not subject to excessive wear, and so arranged that there is little liability of leakage.

The preferred embodiment of the invention is illustrated in the accompanying drawings, wherein:—

Figure 1 is a vertical sectional view through the valve casing, showing the valve in elevation. Fig. 2 is a sectional view on the line 2—2 of Fig. 1. Fig. 3 is a horizontal sectional view on the line 3—3 of Fig. 1. Fig. 4 is a detail horizontal sectional view.

Similar reference numerals designate corresponding parts in all the figures of the drawings.

In the embodiment illustrated, a casing is employed, composed of two sections 4 and 5, preferably threaded or otherwise secured together, the lower section having an outstanding supporting flange 6. The casing is provided with a lower inlet 7, which is preferably interiorly threaded to receive a coupling, and from this inlet, extends a longitudinally restricted passage 8. The upper section has an internal pressure chamber 9, and extending from the lower end of said pressure chamber to the upper end of the passage 8, is a downwardly tapered continuous valve seat 10. The casing furthermore has a lateral outlet port 11 opening through one side of said casing and through one side of the valve seat between the ends thereof.

Operating within the casing, longitudinally thereof, is a reciprocating downwardly tapered valve 12, the taper thereof corresponding to the taper of the valve seat 10, and being movable into and out of engagement with said valve seat. It is so arranged that it fits snugly the entire length of the valve seat, and consequently, when the valve is in closed position, it extends on opposite sides of the exhaust port 11, thereby closing the same. A passage 13 extends longitudinally through the valve, and has its upper portion branched, as shown at 14. Extending upwardly from the top of the valve between the branches is a stem 15 integral with the valve. The said stem terminates in a transversely disposed yoke 16, and journaled in a stuffing box 17 formed on one side of the upper casing section 5, is a shaft 18 having a crank 19 that engages in the yoke. Any suitable operating means such as a handle or a float can be connected to the outer end of the shaft. The valve 12 and lower casing section 4 have alined grooves 20, and a key 21 engaged in both grooves, holds the valve against rotation, but permits it to reciprocate freely. The holding of the valve against rotation assures the yoke 16 remaining in proper position, relative to the crank 19, and prevents the imposition of twisting strain on either the yoke or the crank. It will be observed by reference to Fig. 1 that the groove in the lower casing section extends to the top of said section and that the upper section abuts against the key, thus securely holding said key in position and yet permitting of the removal of the parts, if desired.

It will be obvious that this structure is exceedingly simple, the valve casing made of two parts only, and the upper section carrying the operating means for the valve. The valve itself is so constructed that it will seat perfectly, and will not jam nor become loose. Its operation is made easy, because it is practically balanced by the opposite pressures. While the device is intended for use principally for controlling the passage of fluid under pressure to the atmosphere, it will be evident that it can be employed for other purposes, by making a connection with the lateral or outlet port. In the structure disclosed moreover there are no restricted openings, and a comparatively slight movement will open the valve to its fullest extent. Furthermore in the present structure, but one seat is employed, and the device can also be used for right or left hand cocks, by merely turning the valve to the right or left. There are no loose valve seats, washers or guides, and no springs necessary to maintain the valve seated.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described our invention, what we claim as new, and desire to secure by Letters Patent, is:—

A valve comprising a casing section having an inlet an outlet and a tapered valve seat and also having an interior longitudinal groove extending to its inner end, a casing section detachably connected to the first-named section and having a portion opposed to the end of said groove and also having a lateral stuffing box, a shaft journaled in said stuffing box and having a crank at its inner end and a handle at its outer end, a reciprocating valve having a tapered portion and a portion of even diameter in which latter is a longitudinal groove registered with that of the first-named casing section and also having a stem on which is a yoke receiving the said crank and further having a longitudinal passage branched to straddle the base of the stem, and a longitudinal key removably arranged in the said registered grooves of the first-named casing section and valve and having its outer end opposed to the said portion of the second-named casing section.

In testimony whereof we affix our signatures in presence of two witnesses.

JOHN H. BECKER.
GROVER C. BECKER.

Witnesses:
R. L. LASHELS,
SAM. FITZSIMMONS.